(12) United States Patent
Bechtel et al.

(10) Patent No.: US 12,147,261 B2
(45) Date of Patent: Nov. 19, 2024

(54) MOTION CONTROL INTERFACE DEVICE

(71) Applicant: FCA US LLC, Auburn Hills, MI (US)

(72) Inventors: Travis D Bechtel, Goodrich, MI (US); Brandon Brady, Lapeer, MI (US); Zachary Luetzen, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/303,657

(22) Filed: Apr. 20, 2023

(65) Prior Publication Data

US 2024/0353884 A1    Oct. 24, 2024

(51) Int. Cl.

| G05G 9/04 | (2006.01) |
|---|---|
| B60K 26/02 | (2006.01) |
| B62D 5/00 | (2006.01) |
| G05G 1/08 | (2006.01) |
| G05G 9/047 | (2006.01) |

(52) U.S. Cl.
CPC ......... G05G 9/04788 (2013.01); B60K 26/02 (2013.01); B62D 5/001 (2013.01); *B60K 2026/029* (2013.01); *G05G 1/08* (2013.01)

(58) Field of Classification Search
CPC .. G05G 1/01; G05G 1/04; G05G 1/06; G05G 1/08; G05G 9/047; G05G 9/04788; G05G 9/04792; B60K 26/02; B60K 2026/029; B62D 1/12; B62D 5/001
See application file for complete search history.

(56) References Cited

U.S. PATENT DOCUMENTS

| 2,762,234 A | * | 9/1956 | Roy .......................... G01S 1/02 |
| | | | 74/519 |
| 5,042,314 A | * | 8/1991 | Rytter .................. B62D 11/183 |
| | | | 180/336 |
| 5,450,054 A | * | 9/1995 | Schmersal ............ F16H 59/044 |
| | | | 74/471 XY |
| 5,661,253 A | * | 8/1997 | Aoki ...................... G05G 9/047 |
| | | | 84/718 |
| 7,293,625 B2 | * | 11/2007 | Kumazawa ......... F15B 13/0422 |
| | | | 74/471 XY |
| 9,126,621 B1 | * | 9/2015 | Kim ...................... B60K 26/02 |
| 9,145,141 B1 | * | 9/2015 | Kim .................... G05G 9/04788 |

(Continued)

FOREIGN PATENT DOCUMENTS

| DE | 102020001889 A1 * | 10/2020 |
| EP | 0923015 A2 * | 6/1999 |

(Continued)

OTHER PUBLICATIONS

Machine translation of DE 102020001889 A1 obtained on Feb. 28, 2024.*

(Continued)

*Primary Examiner* — Adam D Rogers
(74) *Attorney, Agent, or Firm* — Jeremy J. Klobucar

(57) ABSTRACT

In at least some implementations, an interface device for control of multiple movements includes a drive controller and a steering controller. The drive controller is adapted to be movable about a pivot axis relative to a base. The steering controller carried by the drive controller for movement with the drive controller and rotatable relative to the drive controller about an axis of rotation that is not parallel to the pivot axis.

20 Claims, 3 Drawing Sheets

(56) References Cited

U.S. PATENT DOCUMENTS

| | | | | |
|---|---|---|---|---|
| 9,315,197 | B1* | 4/2016 | Diaz-Jimenez | B60W 50/10 |
| 9,809,955 | B2* | 11/2017 | Wright | G05G 1/04 |
| 10,807,470 | B2* | 10/2020 | Senba | A61G 5/10 |
| 11,150,683 | B2* | 10/2021 | Kitazawa | G05G 1/01 |
| 11,167,784 | B2* | 11/2021 | Choi | G05G 9/047 |
| 11,214,292 | B2* | 1/2022 | De Simone | B62D 1/12 |
| 2015/0185757 | A1* | 7/2015 | Jantke | B60R 16/005 |
| | | | | 74/471 XY |
| 2018/0106362 | A1* | 4/2018 | Schelbert | G05G 1/02 |

FOREIGN PATENT DOCUMENTS

| | | | | |
|---|---|---|---|---|
| EP | 4227757 A1 * | 8/2023 | | A01D 43/07 |
| WO | WO-2020043400 A1 * | 3/2020 | | B60K 26/02 |

OTHER PUBLICATIONS

Pride Mobility; Types of Hand Controls on Power Wheelchairs; Feb. 22, 2022 (1 page).
https://experience.pridemobility.com/profiles-in-motion/power-wheelchairs/types-of-hand-controls-on-power-wheelchairs/.
Logitech; Extreme 3D Joystick; (1 page).
https://www.logitechg.com/en-us/products/space/extreme-3d-pro-joystick.963290-0403.html?utm_source=google&srsltid=AfmBOorUx1CgUtWt9ZJvTNmYOFEoo_; Website Accessed Sep. 11, 2023.
RcMART; WFLY X9 2.4GHZ 9-Channel FHSS Radio Transmitter w/ RG206S RC Receiver.
https://www.rcmart.com/wfly-x9-2-4ghz-9-channel-fhss-radio-transmitter-w-rg206s-rc-receiver-x9-0; Website Accessed Sep. 11, 2023.

\* cited by examiner

MOTION CONTROL INTERFACE DEVICE

FIELD

The present disclosure relates to an interface device that permits control of multiple movements.

BACKGROUND

Vehicle drive controls include steering wheels by which the steering angle of a vehicle can be changed, an engine or motor(s) to drive the vehicle wheels and move the vehicle, and a brake assembly to slow or stop the vehicle movement. These drive control devices and structures needed to mount them in a vehicle take up space and increase the weight of a vehicle. Further, at least one hand and leg/foot are needed to operate these drive controls.

SUMMARY

In at least some implementations, an interface device for control of multiple movements includes a drive controller and a steering controller. The drive controller is adapted to be movable about a pivot axis relative to a base. The steering controller carried by the drive controller for movement with the drive controller and rotatable relative to the drive controller about an axis of rotation that is not parallel to the pivot axis.

In at least some implementations, the drive controller is adapted to be connected to the base at a first end and to be cantilevered to the base so that a second end opposite the first end is spaced from the base. In at least some implementations, the drive controller has a rear face and a front face, where the rear face is closer to the base than the front face, and wherein the steering controller is mounted to the drive controller with a body of the steering controller adjacent to the front face. In at least some implementations, the steering controller is mounted to the drive controller between the first end and the second end.

In at least some implementations, the drive controller is movable in a first direction wherein the second end is moved closer to the base, and the drive controller is movable in a second direction wherein the second end is moved farther from the base. In at least some implementations, the steering controller is rotatable relative to the drive controller in a first direction and in an opposite second direction. In at least some implementations, the steering controller rotates in a plane that is parallel to the front face. In at least some implementations, the front face is parallel to the pivot axis and the axis of rotation of the steering controller is perpendicular to the pivot axis.

In at least some implementations, an input is carried by the steering controller and movable relative to the steering controller to change the state of a switch. In at least some implementations, the input is movable axially relative to the axis of rotation of the steering controller.

In at least some implementations, a vehicle includes a prime mover arranged to rotate wheels of the vehicle and move the vehicle, a brake assembly arranged to inhibit or prevent rotation of the wheels to slow or stop movement of the vehicle, a steering assembly arranged to permit change in a steering angle of one or more wheels to permit control of the direction of travel of the vehicle, a drive controller and a steering controller. The drive controller is pivotably mounted to a base, the drive controller is coupled to the prime mover and to the brake assembly, the drive controller is movable about a pivot axis in a first direction to activate the prime mover, and the drive controller is movable about the pivot axis in a second direction to active the brake assembly. The steering controller is carried by the drive controller for movement with the drive controller as the drive controller moves, and the steering controller is coupled to the steering assembly and is rotatable relative to the drive controller about an axis that is not parallel to the pivot axis to cause a change in the steering angle.

In at least some implementations, the drive controller is adapted to be connected to the base at a first end and to be cantilevered to the base so that a second end opposite the first end is spaced from the base. In at least some implementations, the steering controller is mounted to the drive controller between the first end and the second end.

In at least some implementations, the drive controller has a rear face and a front face, where the rear face is closer to the base than the front face, and wherein the steering controller is mounted to the drive controller with a body of the steering controller adjacent to the front face. In at least some implementations, the drive controller is movable in a first direction wherein the second end is moved toward the base to actuate the prime mover, and the drive controller is movable in a second direction wherein the second end is moved away from the base to actuate the brake assembly or cease actuation of the prime mover, or both. In at least some implementations, the steering controller is rotatable relative to the drive controller in a first direction to change the steering angle of the vehicle to the left and in an opposite second direction to change the steering angle of the vehicle to the right. In at least some implementations, the steering controller rotates in a plane that is parallel to the front face. In at least some implementations, the front face is parallel to the pivot axis and the axis of rotation of the steering controller is perpendicular to the pivot axis.

The interface device having a drive controller and steering controller can permit one-handed control of a vehicle or other device or thing, with compound movements of the device or thing achieved by pivoted movement of the drive controller combined with rotational movement of the steering controller. Thus, for example, acceleration or braking of a vehicle may be controlled with the drive controller and steering of the vehicle may be controlled via the steering controller. The interface device is adaptable to a wide range of uses, and can replace many larger and more complex systems, like traditional accelerator and brake pedals, steering wheels, and related structures, by way of and non-limiting example. The device can be used by all persons and may find particular use with physically handicapped persons who cannot operate traditional vehicle controls, or controls for other devices as noted herein.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
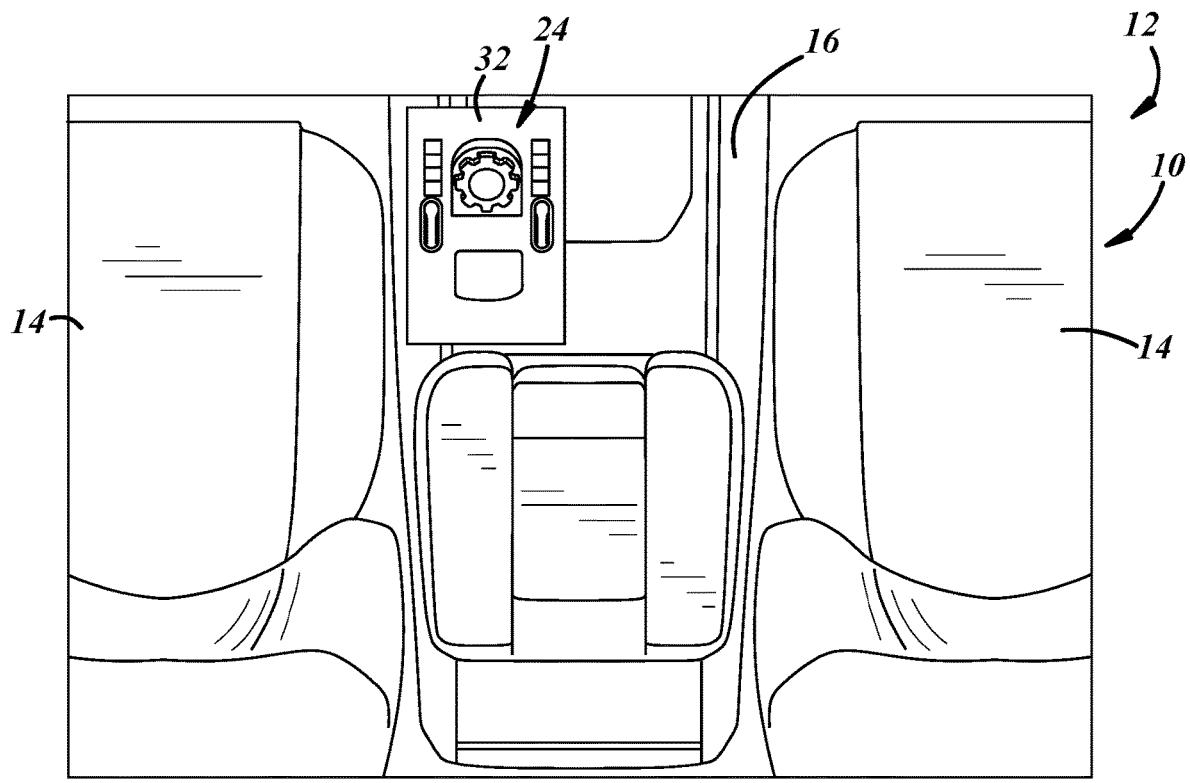
FIG. 1 is a plan view of part of a passenger compartment of a vehicle that includes an interface device.

Referring in more detail to the drawings, FIG. 1 illustrates part of a passenger compartment 10 of a vehicle 12. The passenger compartment 10, as is common, includes seats 14 for passengers and one seat may be designated for a driver or operator of the vehicle 12. A center console 16 may be provided between two seats, and the console 16 may include one or more storage compartments and also inputs or interfaces for various vehicle 12 systems, like heating and cooling systems, audio system, seat adjustment controls, controls that are part of a human-machine interface that permits control of various systems in the vehicle 12 like those mentioned, navigation systems, mobile device interfaces, and the like.

Figure 5:
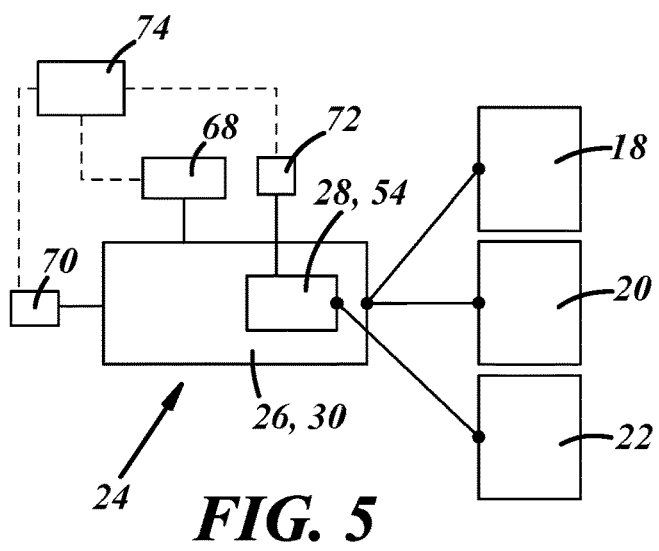
FIG. 5 is a diagrammatic view of a system having an interface device coupled to multiple drive controls.

As shown in FIG. 5, the vehicle 12 includes main drive controls that permit operation of the vehicle 12 along a path of travel. To drive the vehicle 12 along the path, the vehicle 12 includes a prime mover 18 that may include a combustion engine one or more electric motors, or both, coupled to one or more wheels of the vehicle 12 to rotate the wheels. To slow or stop a moving vehicle 12, the vehicle 12 includes a brake system 20 that may include one or more brake assemblies associated with one or more wheels of the vehicle 12. And to permit control of the direction of vehicle travel, the vehicle 12 includes a steering system 22 that is operable to change the steering angle of one or more wheels.

To permit control of the main drive controls of the vehicle 12, the vehicle 12 includes an interface device 24 having a drive controller 26 and a steering controller 28. The drive controller 26 is coupled to the prime mover 18 and to the brake system 20 (e.g. one or more brake assemblies) to actuate the prime mover 18 and brake system 20 in response to movement of the drive controller 26, and the steering controller 28 is coupled to the steering system 22 to cause a change in steering angle upon movement of the steering controller 28, as set forth in more detail below. The coupling between the interface device 24 and the main drive controls of the vehicle 12 may be accomplished in a so-called "by wire" arrangement, such as drive-by-wire, brake-by-wire and steer-by-wire. In these arrangements, electric motors/actuators may be coupled to the drive controls and actuated in response to inputs provided at the interface device 24, as is generally known. Thus, the coupling does not require direct mechanical connection between the interface device 24 and the drive controls of the vehicle 12.

In at least some implementations, the drive controller 26 and steering controller 28 are integrated into a single interface device 24 that can be manipulated by a single hand of a user. In the implementation shown in the drawings, with specific reference to FIGS. 2 and 4, the interface device 24 includes the drive controller 26 which has a body 30 that is pivotably connected to a base 32. The base 32 may be a separate component mounted in the vehicle 12, or a surface of the vehicle 12, for example part of a dashboard, console 16, seat or other portion of the vehicle 12. The drive controller body 30 may be cantilevered to the base 32 at a first end 34 and extend away from the base 32 to a second end 36. In at least some implementations, the body 30 is coupled to the base 32 at a pivot 38 for rotation or pivoted movement about a pivot axis 40 that is parallel to an upper surface 42 of the base 32. The body 30 may further have side walls 44 or edges that extend between the first end 34 and the second end 36, a rear face 46 (FIG. 4) arranged facing toward the base 32 and an opposite front face 48 arranged facing outward away from the base 32 and into the passenger compartment 10. The front face 48 may have a portion that is flat or planar and that is arranged parallel to the pivot axis 40. In at least some implementations, the body 30 may be rigid so that it does not bend or flex under the forces needed to pivot the body 30, and the body 30 may be defined in a single piece of material, if desired.

Figure 4:
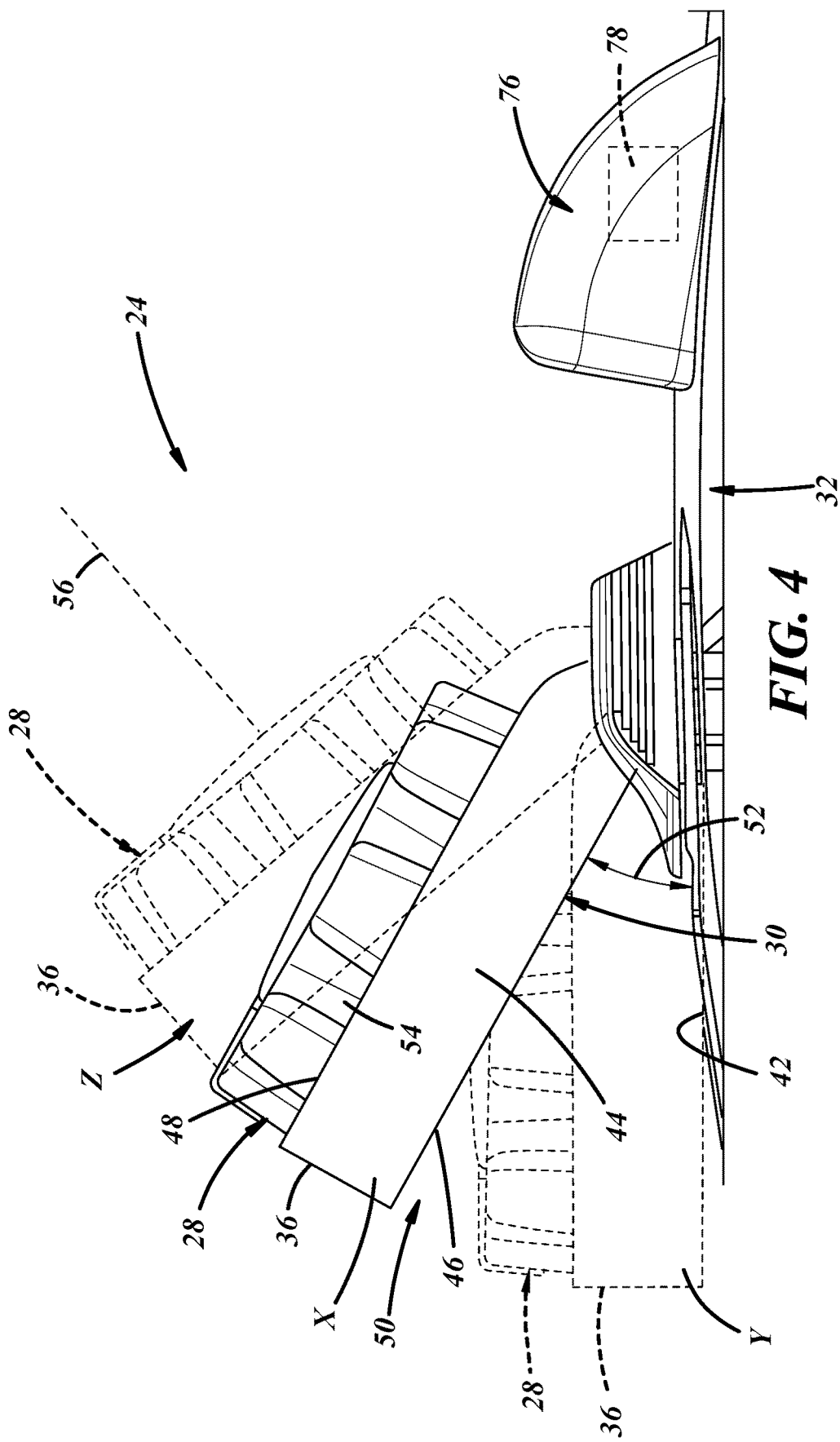
FIG. 4 is a side view of the interface device showing a drive controller body in different positions.

In a first position, the body 30 of the drive controller 26 may be arranged at an non-zero angle to the base 32, with the second end 36 spaced from the base 32 and with a space 50 defined between the rear face 46 and the upper face of the base 32. So arranged, the body 30 can be moved in a first direction, toward the base 32, where the first direction is perpendicular to the pivot axis 40. In at least some implementations, in the first position of the body 30 an included angle 52 (FIG. 4) may be defined between the body 30 (e.g. the rear face 46) and the base 32 (e.g. the upper face) that is between twenty (20) degrees and sixty (60) degrees, and which may be between twenty (20) degrees and forty-five (45) degrees. In at least some implementations, the base 32 is located beneath the body 30 with respect to the direction of gravity, and the first direction is a direction in which the body 30 is pushed downward, toward the base 32 such that the second end 36 of the body 30 moves closer to the base 32 during this movement. Similarly, the body 30 can move about the pivot axis 40 in an opposite, second direction, during which movement the second end 36 of the body 30 moves away from the base 32. Movement of the body 30 is shown in FIG. 4 wherein the position labeled X is a nominal first or home position, the position labeled Y shows the body after it was displaced in the first direction from position X, and the position labeled Z shows the body after it was displaced in the second direction from position X.

In at least some implementations, movement of the drive controller 26 in the first direction actuates the prime mover 18 to rotate the vehicle 12 wheels and move the vehicle 12. This movement may be similar to movement of an accelerator pedal in a vehicle 12. In at least some implementations, movement of the drive controller 26 in the second direction causes a reduction in vehicle acceleration, a slowing of the vehicle speed, and may lead to stopping movement of the vehicle 12. That is, movement of the body 30 in the second direction in a first range, may reduce actuation of the prime mover 18 to cause the prime mover 18 to drive the wheels with less force (e.g. less torque), movement in a second range greater than the first range and which may include the first position of the drive controller body 30 may de-actuate the prime mover 18 to stop the prime mover 18 from actively driving the vehicle 12 wheels or it may actuate a brake assembly to apply a braking force to slow wheel rotation, and continued application of the braking force or de-actuation of the prime mover 18 may cause the vehicle 12 to stop. This movement may be considered to be similar to letting off the accelerator to allow the accelerator to return toward a home or initial position or applying force to a brake pedal to actuate the brake system 20. In this way, movement of the drive controller 26 can be done to control movement of the vehicle 12.

In at least some implementations, the steering controller 28 is mounted to and carried by the drive controller 26. In the example shown, the steering controller 28 includes a body 54 that is connected to the base 32 by a mount or bracket so that the steering controller body 54 extends outwardly from the front face 48 of the drive controller body 30 and is rotatable relative to the mount and the drive controller body 30 about an axis of rotation 56. The axis of rotation 56, in at least some implementations, is perpendicular to the pivot axis 40, and may be perpendicular to the front face 48 of the drive controller body 30. The axis of rotation 56 is spaced from the pivot axis 40 by a distance of between one and four inches (where the distance may be measured in a direction perpendicular to both axes 40, 56), in at least some implementations. In this way, the steering controller 28 moves with the drive controller 26 when the drive controller 26 is moved in the first and second directions as noted above, and the steering controller 28 can be rotated relative to the drive controller 26.

Rotation of the steering controller 28 actuates the steering system to cause a change in the steering angle of the vehicle 12 and hence, a change in the direction of vehicle travel. Rotation of the steering controller 28 in a first direction changes the steering angle in the first direction, and rotation of the steering controller 28 in a second direction, opposite to the first direction, changes the steering angle in the second direction. In the example shown, the steering controller 28 is rotated counterclockwise to steer the vehicle 12 left, and the steering controller 28 is rotated clockwise to steer the vehicle 12 to the right. In at least some implementations, the steering controller 28 may be rotated relative to the drive controller 26 in any position of the drive controller 26. That is, steering changes can be made while the vehicle 12 is accelerating, traveling at a constant speed or braking.

The steering controller body 54 may include recesses 58 to facilitate grasping of the body by a user, and to reduce slippage of a user's hand from the steering controller 28. The recesses 58 may include surfaces at a variable distance from the rotational axis 56, as well as undercuts designed to facilitate application of a pulling force to the steering controller body 54 and/or the drive controller body 30. In this regard, the undercut may be defined by a flange or surface 60 of or on the steering controller body 54 that extends farther from the axis of rotation 56 and which axially overlies a surface 62 located closer to the axis of rotation 56 and also closer to the front face 48 of the drive controller body 30. In some implementations, a user may apply a pulling or pushing force to one or both of the drive controller body 30 and steering controller body 54, as desired. Instead of or in addition to the undercut on the steering controller body 54, undercut pockets or recesses 61 may be provided on the body 30, and may be formed in one or both sidewalls 44, such as is shown in dashed lines in FIG. 3. Here, dashed lines are used because the recess(es) 61 may be formed below the front face 48 of body 30 and in such a construction, would not be directly viewable in FIG. 3. The recesses 61 may receive a thumb and finger of a user to provide a more secure grip on the body 30 for control of vehicle speed.

In use, a user may grasp the steering controller body 54 and by pushing or pulling on the steering controller 28, in a direction generally perpendicular to the axis of rotation 56, may move the drive controller body 30 about the pivot 38. That is, the force needed to move the drive controller body 30 may be applied to the steering controller 28 without a user directly touching/engaging the drive controller body 30. In this way, a single hand of the user may easily move the drive controller body 30 and rotate the steering controller body 54. Further, the vehicle 12 may be steered while actuating the prime mover 18 or brake system 20 by a compound motion involving pushing or pulling on the steering controller 28 to move the driver controller while rotating the steering controller 28.

Figure 2:
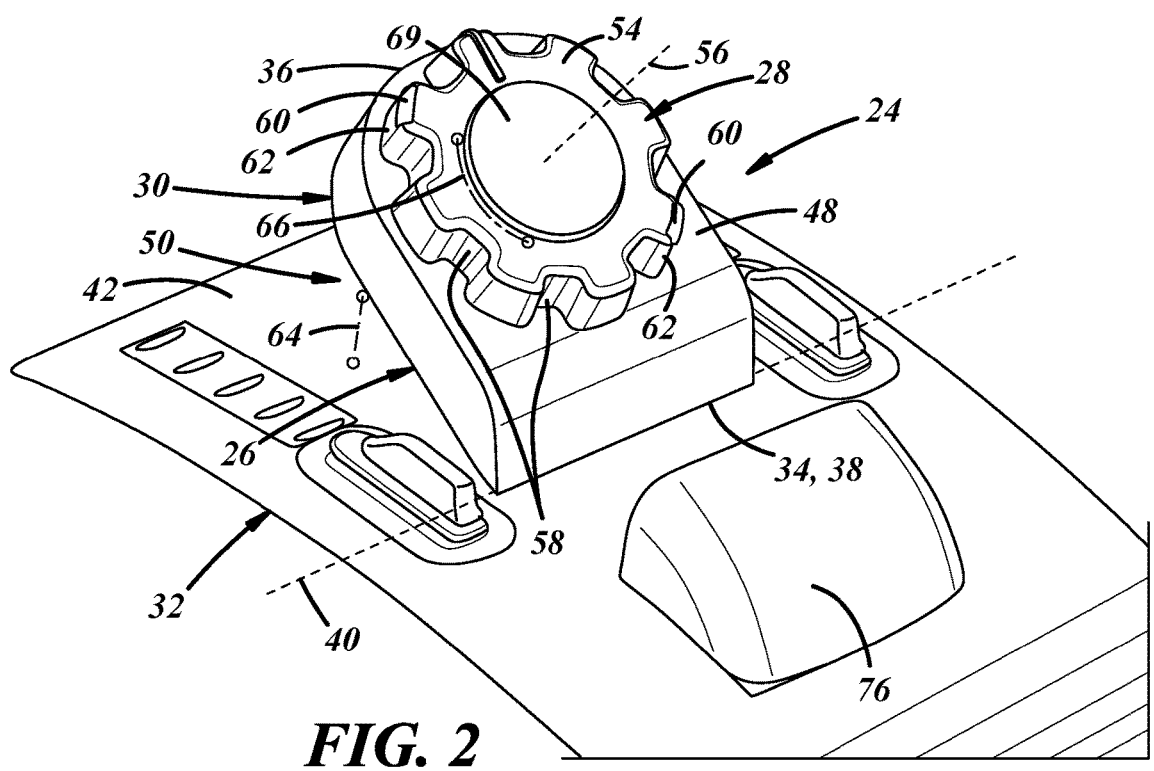
FIG. 2 is a perspective view of the interface device.

To facilitate use of the interface device 24, the device may return to the first position (which may be called a home position), shown in FIG. 2, absent force on the device. For example, the drive controller body 30 may be biased to the first position so that if pushed toward the base 32 and thereafter released, the drive controller body 30 will return to the first position, or if pulled away from the base 32 from the first position, to actuate the brake system 20, the drive controller body 30 will return back to the first position under spring force. In an electric vehicle 12, regenerative braking may also be enabled via movement of the interface device 24, similar to such operation with a vehicle 12 including foot pedals.

Similarly, the steering controller 28 may be biased to its first position, which may be a neutral or centered position, which may relate to a zero steering angle that permits straight travel of the vehicle 12. Thus, if the steering controller 28 is rotated in either direction and then released, the steering controller 28 will return under the biasing force back to the first or neutral position of the steering controller 28. The biasing forces on both bodies may be provided by suitably arranged springs 64, 66, shown diagrammatically in FIG. 2, where one or more springs may act on each body 30, 54.

Further improvements may be provided, as desired. For example, when a reverse gear is selected to permit reverse movement of the vehicle 12, the system can be arranged so that moving the drive controller body 30 in the second direction about the pivot axis 40, e.g. away from the base 32, may actuate the prime mover 18 to drive the vehicle 12 in a reverse direction. Steering while moving in the reverse direction can be accomplished by rotating the steering controller body 54 as described already. Thus, instead of actuating the brake system 20 by such movement of the drive controller body 30, the system may recognize the selection of reverse gear and function accordingly. In some implementations, a reverse or other drive gear may be selected by a pattern of movement of the interface controller. By way of non-limiting examples, moving the drive controller body 30 in the second direction twice (e.g. pulling back on the body twice) in succession and within a certain time period may cause the vehicle 12 to shift or permit reverse vehicle travel. Similarly, two or more pushes of the drive controller body 30 toward the base 32 may indicate a desire for forward travel and may cause the vehicle 12 to shift into a forward drive gear or permit forward driving.

Further, to avoid the need to hold the drive controller body 30 in a particular position, an actuator 68 (FIG. 5), which may be electrically driven and controlled, may be coupled to the drive controller body 30 and be operational to hold the drive controller body 30 in a particular angle relative to the base 32 (i.e. rotational position about the pivot 38). This may maintain a vehicle speed, as desired.

Of course, cruise control devices and the like may be used to permit a speed to be retained without need for the drive controller body 30 to remain in a rotated position. That is, after setting a desired speed, a control system may operate the prime mover 18 to achieve and maintain the speed without requiring the drive controller 26 to be rotated from its first position, or permitting the drive controller body 30 to return to the first position while maintaining a desired speed (where the desired speed may include a desired following distance from a vehicle 12 ahead, without regard to a specific speed in a so-called adapted cruise control system). Still further, the vehicle 12 could be capable of at least somewhat autonomous driving, where the interface device 24 is needed only when a driver wishes to command the vehicle 12 drive controls directly, or otherwise.

In at least some implementations, an input 69 is carried by the steering controller body 54 and is movable relative to the steering controller 28 to change the state of a switch. The input 69 could, for example, control actuation of cruise control or other vehicle setting, like putting the vehicle into a park gear or setting, or otherwise changing the vehicle drive gear or setting. In the example shown, the input is a push button that is movable axially relative to the axis of rotation 56 of the steering controller 28.

Figure 3:
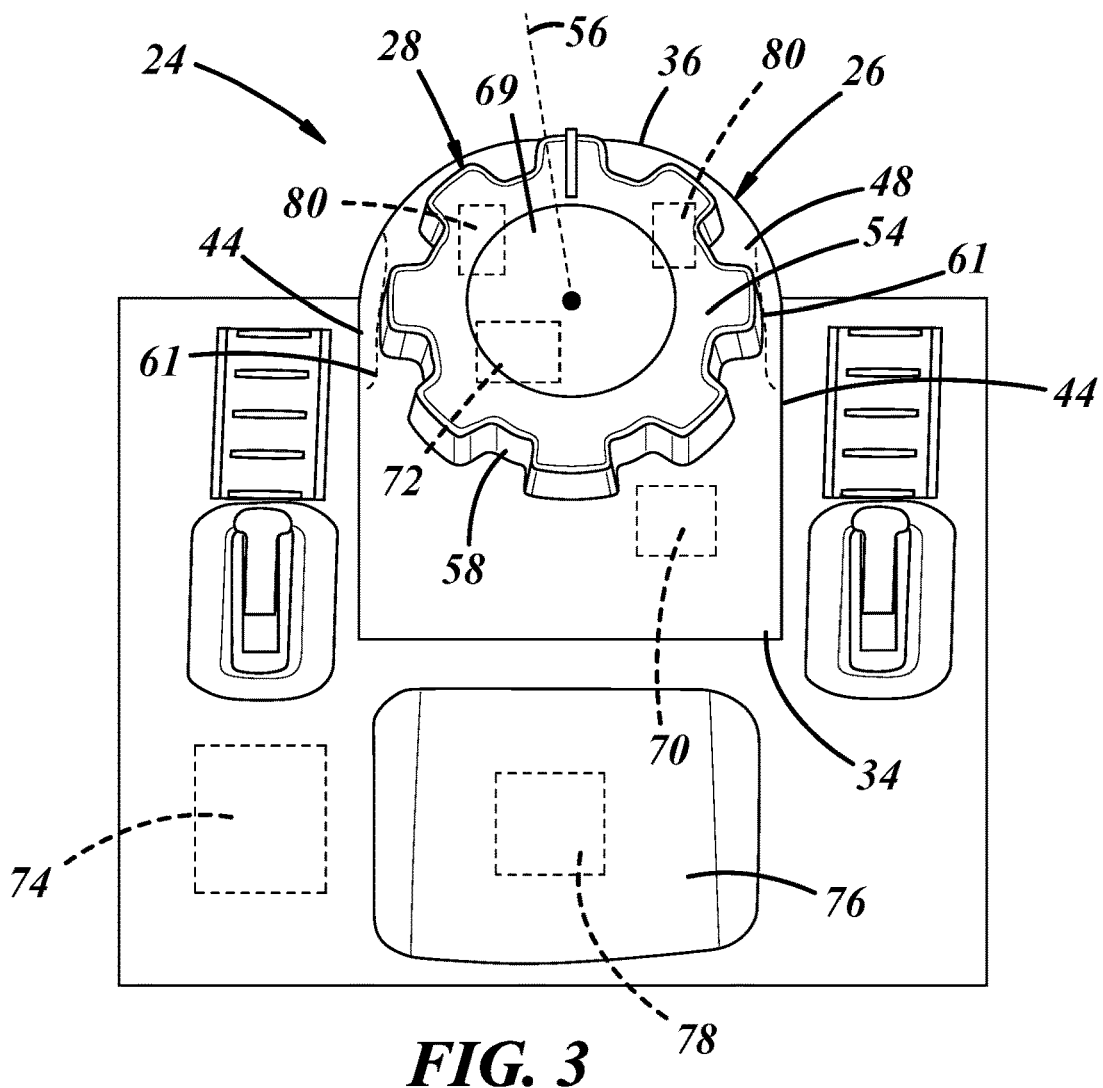
FIG. 3 is a front view of the interface device.

As shown in FIGS. 3 and 5, suitable sensors 70, 72 and one or more microcontrollers 74 may be used to sense the position of the drive controller body 30 and the steering controller body 54, with such positions relayed to appropriate control devices to cause a desired action, as noted herein. Further, force feedback may be provided, such as by a servo actuator, to improve the feel of the interface device 24 and to provide feedback to a user.

Further, a wrist rest 76 may be provided on the base 32 or otherwise adjacent to the interface device 24. The wrist rest 76 may provide stability to a user's arm to reduce fatigue and improve accuracy of the intended movements of the interface device 24. A sensor 78 may be provided in or near the wrist rest 76 that is responsive to the presence of a user's arm/wrist on the wrist rest 76, and this presence may unlock or enable control of the vehicle 12 via the interface device 24. This may prevent unintended or inadvertent actuation of the interface device 24 to avoid unintended commands to the vehicle 12 drive controls. In at least some implementations, presence of a user's arm on the wrist rest 76 may be required to permit a vehicle 12 to be shifted out of a park gear or setting. Similarly, as shown in FIG. 3, one or more sensors 80 may be provided on the interface device 24 (e.g. on the steering controller body 54) to detect the presence of a user's hand in predetermined locations on the device, which indicates the user intends to control the device and is not merely resting their hand or arm on the device.

The presence sensors 78, 80 may be used in several ways. For example, to permit shifting a vehicle 12 out of park, or other operation of the interface device 24, a system may be arranged so that presence of a user's arm on the wrist rest 76 and presence of a user's hand on the interface device 24 need to be determined before operation of the interface device 24 is permitted or before such operation causes a corresponding action with respect to the vehicle 12 drive controls. That is, the interface device 24 could include a lock to prevent movement of the device 24 until unlocked, or movement of the device without detection of the presence of a user's arm and/or hand could be ignored by the system such that no drive control commands are issued.

Certain other vehicle 12 controls may be located on or near the interface device 24, like a transmission or other gear selector by which the vehicle 12 may be placed into park, reverse of forward drive gear. In this way, further one-handed control of the vehicle 12 is possible.

While noted as being mounted in a vehicle 12 console 16 for use by a driver of the vehicle 12, the interface device 24 may be used in many different applications, and installed in different locations. The interface device 24 may be mounted to a movable carrier to permit movement of the device for use in different locations within a vehicle 12 or other application, such as to permit use by either hand of a user, and/or by a user who is standing or sitting. The interface device 24 may be storable out of sight for autonomous driving or driving via other controls such as a traditional steering wheel and pedals, and deployable for use as desired.

By way of non-limiting examples, the interface device 24 could be used in any vehicle 12, including cars, trucks, busses, hi-lo/forklift, skid steer, electric pallet jack, and others. And the interface device 24 can be used as an input for a video game system or as a computer mouse, or as a controller for a drone, or the like.

The interface device 24 could enable a vehicle 12 to not have a steering wheel or similar steering device, or acceleration and brake pedals, or the structures which mount these devices in the vehicle 12, saving space and weight for the vehicle 12. A gear shifter might also not be needed whereby gears are selected via the interface device 24.

What is claimed is:

1. An interface device for control of multiple movements, comprising:
   a base having an upper surface;
   a drive controller having a body that is coupled to the base at a pivot so that the body is movable about a pivot axis relative to the base, the pivot axis is parallel to the upper surface and the body is connected to the base so that the body moves only by rotation about the pivot axis in a first direction and an opposite second direction, the body has a rear face that faces toward the upper surface and the body has a front face with at least a portion that is flat and parallel to the pivot axis, the body is arranged with the front face facing outward away from the upper surface; and
   a steering controller having a steering controller body that extends outwardly from the front face and is carried by the drive controller for movement with the drive controller and is rotatable relative to the drive controller about an axis of rotation that is not parallel to the pivot axis, wherein the steering controller body rotates in a plane that is parallel to the at least a portion of the front face that is flat.

2. The device of claim 1 wherein the drive controller is adapted to be connected to the base at a first end and to be cantilevered to the base so that a second end opposite the first end is spaced from the base.

3. The device of claim 2 wherein the rear face is closer to the base than the front face, and wherein the steering controller is mounted to the drive controller with the steering controller body adjacent to the front face.

4. The device of claim 3 wherein, when the drive controller is moved in the first direction, the second end is moved closer to the base, and when the drive controller is moved in the second direction, the second end is moved farther from the base.

5. The device of claim 3 wherein the steering controller is rotatable relative to the drive controller in a first direction and in an opposite second direction.

6. The device of claim 5 wherein the steering controller body has a lower surface adjacent to and parallel to the front face, and wherein the lower surface is within a periphery of the front face such that the steering controller body does not extend beyond the periphery of the front face.

7. The device of claim 5 wherein the front face is parallel to the pivot axis and the axis of rotation of the steering controller is perpendicular to the pivot axis.

8. The device of claim 2 wherein the steering controller is mounted to the drive controller between the first end and the second end.

9. The device of claim 1 which also includes an input carried by the steering controller and movable relative to the steering controller to change the state of a switch.

10. The device of claim 9 wherein the input is movable axially relative to the axis of rotation of the steering controller.

11. A vehicle, comprising:
a prime mover arranged to rotate wheels of the vehicle and move the vehicle;
a brake assembly arranged to inhibit or prevent rotation of the wheels to slow or stop movement of the vehicle;
a steering assembly arranged to permit change in a steering angle of one or more of the wheels to permit control of the direction of travel of the vehicle;
a base having an upper surface;
a drive controller having a body that is pivotably mounted to the base, the drive controller is coupled to the prime mover and to the brake assembly, the body is movable about a pivot axis in a first direction to activate the prime mover, and the body is movable about the pivot axis in an opposite second direction to active the brake assembly, wherein the pivot axis is parallel to the upper surface and the body is connected to the base so that the body moves about the pivot axis in the first direction and the second direction and the body does not move in other directions, and the body has a rear face that faces toward the upper surface and the body has a front face facing outward away from the upper surface; and
a steering controller received on the front face of the body for movement with the drive controller as the drive controller moves, and the steering controller is coupled to the steering assembly and is rotatable relative to the drive controller about an axis that is not parallel to the pivot axis to cause a change in the steering angle and wherein the steering controller rotates in a plane that is parallel to the front face.

12. The vehicle of claim 11 wherein the drive controller is adapted to be connected to the base at a first end and to be cantilevered to the base so that a second end opposite the first end is spaced from the base.

13. The vehicle of claim 12 wherein the rear face is closer to the base than the front face, and wherein the steering controller is mounted to the drive controller with a body of the steering controller adjacent to the front face.

14. The vehicle of claim 13 wherein, when the drive controller is moved in the first direction, the second end is moved toward the base to actuate the prime mover, and when the drive controller is moved in the second direction, the second end is moved away from the base to actuate the brake assembly or cease actuation of the prime mover, or both.

15. The vehicle of claim 13 wherein the steering controller is rotatable relative to the drive controller in a first direction to change the steering angle of the vehicle to the left and in an opposite second direction to change the steering angle of the vehicle to the right.

16. The vehicle of claim 15 wherein the steering controller rotates in a plane that is parallel to the front face.

17. The vehicle of claim 15 wherein the front face is parallel to the pivot axis and the axis of rotation of the steering controller is perpendicular to the pivot axis.

18. The vehicle of claim 12 wherein the steering controller is mounted to the drive controller between the first end and the second end.

19. The vehicle of claim 11 which also includes an input carried by the steering controller and movable relative to the steering controller to change the state of a switch.

20. The vehicle of claim 11 wherein the steering controller has a body with a lower surface that is arranged adjacent to and parallel to the front face, and wherein the lower surface is within a periphery of the front face such that the steering controller body does not extend beyond the periphery of the front face.

* * * * *